United States Patent [19]

Weber et al.

[11] Patent Number: 5,026,789

[45] Date of Patent: Jun. 25, 1991

[54] CURABLE IMPACT MODIFIED EPOXY RESIN HAVING STABILIZED MULTIPHASE MORPHOLOGY

[75] Inventors: Thomas Weber, Ludwigshafen; Walter Heckmann, Weinheim; Jürgen Mertes, Ludwigshafen; Helmut Tesch, Roedersheim-Gronau; Volker Altstaedt, Gernsheim; Wolfgang Eberle, Mainz; Thomas Folda, Neuleiningen; Herbert Stutz, Karlsruhe, all of Fed. Rep. of Germany; Hans-Gert Recker, Irvine, Calif.

[73] Assignee: BASF Aktiengesellschaft, Ludwigshafen, Fed. Rep. of Germany

[21] Appl. No.: 451,387

[22] Filed: Dec. 15, 1989

[30] Foreign Application Priority Data

Dec. 16, 1988 [DE] Fed. Rep. of Germany ....... 3842306

[51] Int. Cl.$^5$ ............................................. C08G 59/50
[52] U.S. Cl. .................................... 525/423; 525/471; 525/481; 525/482; 525/484; 525/524; 525/526; 525/534; 525/535; 428/413
[58] Field of Search ............... 525/423, 471, 481, 482, 525/484, 524, 526, 534

[56] References Cited

U.S. PATENT DOCUMENTS

| | | | |
|---|---|---|---|
| 4,608,404 | 8/1986 | Gardner et al. | 525/423 |
| 4,645,803 | 2/1987 | Kohli et al. | 525/423 |
| 4,656,207 | 4/1987 | Jabloner et al. | 523/400 |
| 4,746,718 | 5/1988 | Gardner et al. | 525/471 |
| 4,855,339 | 8/1989 | Saito et al. | 528/99 |
| 4,900,848 | 2/1990 | Saito et al. | 525/423 |

FOREIGN PATENT DOCUMENTS 0193082 3/1986 European Pat. Off. .

*Primary Examiner*—John Kight, III
*Assistant Examiner*—Frederick Krass
*Attorney, Agent, or Firm*—William G. Conger

[57] ABSTRACT

A curable impact modified epoxy resin mixture suitable for producing high performance composites is composed of
A. an aromatic epoxy compound,
B. an amine type curing agent,
C. from 10 to 40% by weight of an aromatic thermoplastic oligomer which contains reactive groups, preferably a polyether sulfone, and
D. from 0.1 to 10% by weight of a high molecular weight emulsifier, preferably a phenoxy resin, an epoxy resin or a thermoplastic copolymer, which is compatible not only with the epoxy compound A but also with oligomer C.

5 Claims, No Drawings

CURABLE IMPACT MODIFIED EPOXY RESIN HAVING STABILIZED MULTIPHASE MORPHOLOGY

The present invention relates to an impact modified epoxy resin mixture which can be cured to form high temperature resistant moldings of high stiffness and strength.

EP-A-193,082 discloses that the toughness of cured moldings from epoxy resins can be increased by the addition of certain oligomeric aromatic thermoplastic polymers. In the cured product, two discrete glassy phases are present, of which one has a higher and the other a lower thermoplastics content.

On repeating the examples of EP-A-193,082 and observing the epoxy resin mixture under the microscope during curing, one or more phase separations are found to occur. These phase separations give rise to discrete phases (islands) which in size and shape do not remain constant but change. The islands present in the fully cured resin are not uniform but vary in size and shape. If the nature and mixing ratios of the components or the curing conditions are changed ever so slightly, a profound change occurs in the size, shape and stability of the discrete phase and its time of formation. The system is thus thermodynamically unstable.

The morphology of the fully cured resin, i.e. the network structures of the phases, has a very pronounced effect on the mechanical properties of the finished moldings. Thus, starting from one and the same epoxy resin composition, a different curing temperature and heating cycle produces a different network structure. But a different network structure entails different mechanical properties. Since in practice, in particular in the production of thick moldings, the curing temperatures fluctuate within a molding under cure and, what is more, processors use different heating cycles, it is an object of the present invention to develop an epoxy resin mixture with a morphology which is independent of the curing temperature and the nature of the heating cycle and which on curing thus produces moldings with consistent mechanical properties and no product variation.

We have found that this object is achieved according to the present invention on adding to the epoxy resin mixture from 0.1 to 10, preferably from 0.3 to 5, % by weight of a high molecular weight emulsifier which is compatible not only with epoxy compound A but also with polymer C.

This emulsifier acts as a phase stabilizer and as a phase coupler; it affects the phase interface by reducing the interface boundary tension and hence produces optimum adhesion between the phases. The result is a thermodynamically stable two-phase system which is also stable to variations in resin composition and curing conditions. Furthermore, the fully cured resin exhibits islands of uniform size and shape.

The present invention accordingly provides a curable impact modified epoxy resin mixture containing A. an aromatic, at least bifunctional epoxy compound having an average molecular weight $M_n$ of less than 2000, B. an at least bifunctional amine type curing agent, and C. from 10 to 40% by weight of an aromatic thermoplastic polymer which contains reactive groups and has a number average molecular weight of above 2000 and a glass transition temperature of above 120° C., with the proviso that epoxy groups and the active hydrogen atoms of components B and C are present in a ratio of from 0.8:1 to 1.6:1, also containing D. from 0.1 to 10% by weight, preferably from 0.5 to 5% by weight, of a high molecular weight emulsifier which is compatible not only with epoxy compound A but also with polymer C.

There now follow observations concerning the individual components:

A. Epoxy compounds are low molecular weight compounds with terminal, internal or cyclically incorporated epoxy groups. It is particularly advantageous to use reaction products of polyfunctional alcohols, phenols, cycloaliphatic carboxylic acids, aromatic amines or aminophenols with epichlorohydrin and also cycloaliphatic epoxys and cycloaliphatic epoxide esters. It is also possible to use mixtures of various epoxy compounds. Preference is given to bisphenol A diglycidyl ethers, bisphenol F diglycidyl ethers and triglycidyl ethers of paraaminophenols and also to mixtures thereof. Particularly favorable results are obtained with the dicyclopentadiene-based epoxy compound of the formula I as described in U.S. Pat. No. 3,535,734. Further suitable epoxy compounds are given in EP-A-103,082. The epoxy compounds have a glass transition temperature of preferably below 20° C. Their average molecular weight is below 2000, preferably below 1500.

B. Preferred amine type curing agents are aromatic diamines, e.g. 4,4'-diaminodiphenyl sulfone, 3,3'-diaminodiphenyl sulfone, diaminodiphenyl ketone and diaminodiphenyl ether, but also diamines with four phenylene radicals as described for example in EP-A-126,494. It is basically also possible to use other customary epoxy curing agents, such as dicyandiamide and boron trifluoride/amine complexes. Further amine type curing agents are described in EP-A-193,082.

C. The aromatic polymer contains functional end groups capable of reacting with the epoxy groups of the epoxy compound, e.g. amine, hydroxyl or carboxyl groups. Preference is given to polymers having two hydroxyl or amino end groups. Their average molecular weight is above 2000, preferably within the range from 4000 to 20,000; their glass transition temperature is above 120° C., preferably within the range from 140° C. to 260° C. Preference is given to amine-terminated polysulfones and polyether sulfones and to corresponding copolymers. Further details, in particular concerning their preparation, may be found in EP-A-193,082. The aromatic polymer is present in the epoxy resin mixture according to the present invention in an amount of from 10 to 40, preferably from 10 to 25, % by weight.

D. The emulsifier D is a preferably linear polymer which has an average molecular weight $M_n$ of more than 4000 and which is soluble either a. in both components A and C or b. only in one component A or C and is capable of reacting chemically or physically in the form of dipole interactions with the other component under curing conditions.

Preferred emulsifiers are phenoxy resins of the formula II

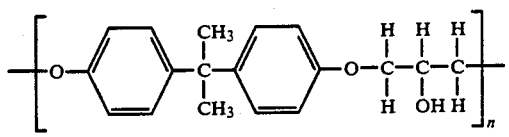

(II)

where n is from 50 to 150. They are marketed by Union Carbide Corp. under the designation UCAR.

Further suitable emulsifiers are epoxy resins having an average molecular weight of preferably greater than 5000, e.g. Epikote 1009 from Shell Oil Comp. and DER 669 from Dow Chemical Comp. Finally, it is also possible to use random and block copolymers formed from the same units as polymer C, for example copolymers of polysulfone/polyether sulfone, polyether sulfone/polyether ketone, polysulfone/polyether ketone, polyether sulfone/polyamide, polysulfone/polyamide, polyether sulfone/polyimide or polysulfone/polyimide. In contradistinction to polymers C, thermoplastic polymers D do not have any reactive end groups. In the epoxy resin mixture, the ratio of epoxy groups to active hydrogen atoms on components B and C is from 0.8:1 to 1.6:1, preferably from 0.9:1 to 1.4:1.

The epoxy resin mixture may further contain customary additives, such as catalysts, for example phosphines, and elasticizing agents, such as butadiene/acrylonitrile rubbers.

To prepare the epoxy resin mixture according to the present invention, liquid components can be added together with stirring and/or a solid component can be dissolved in a liquid component. Preferably, however, first a preliminary reaction is carried out between the epoxy compound A, the reactive polymer C and the emulsifier D using, if desired, initially only an equivalent proportion of the epoxy compound. This preliminary reaction is preferably carried out at from 80° to 140° C. and in general takes from 30 to 360 minutes. The curing agent B and any epoxy compound A remaining are then added together with a curing catalyst to start the curing reaction which takes place at from 100° to 240° C.

Under the microscope the cured product clearly shows two separate phases, of which the coherent phase probably has a higher polymer C content than the dispersed phase. The islands of dispersed phase are virtually uniform in size and shape.

The dispersed phase content is in general from 30 to 70% by volume, and the size of the dispersed domain is from 0.1 to 10 μm. The cured product according to the present invention has extremely high values for the fracture energy $G_{IC}$ and the stress intensity factor $K_{IC}$. The significance of these values and methods for measuring them are described in detail in EP-A-193,082, where further references are cited. The $K_{IC}$ values are in general above 1.2 [MPa·m$^{\frac{1}{2}}$], preferably above 1.4 [MPa·m$^{\frac{1}{2}}$].

The epoxy resin mixture according to the present invention is suitable for producing high temperature resistant moldings of high stiffness, toughness and dimensional stability, for example for aerospace components, for structural adhesives and for printed circuits.

The epoxy resin mixture is particularly suitable for producing high performance composites. They contain in general from 30 to 70% by volume of reinforcing fibers, preferably carbon, glass or aromatic polyamide fibers, for example in the form of woven fabrics, laid fabrics composed of parallel bundles of continuous fiber, or individual rovings. To produce these composites, the fibers are impregnated with the epoxy resin mixture, which may have been preheated, and the resulting prepreg is cured before or after molding.

In the Examples, parts are by weight.

EXAMPLE 1

46 parts of the triglycidyl ether of paraaminophenol were admixed at 120° C. with 0.004 part of triphenylphosphine, 25 parts of an OH-terminated polysulfone ($M_n = 11,000$) and 1.5 parts of a phenoxy resin of the formula II (having a degree of polymerization of about 100), and the mixture was stirred for 2 hours. 29 parts of 4,4-diaminodiphenyl sulfone were then added, and the mixture was cured at 177° C. for 2 hours and at 200° C. for a further 2 hours. The product was found to have a $K_{IC}$ value of 1.4 [MPa·m$^{\frac{1}{2}}$].

EXAMPLES 2-5

17.3 parts of the triglycidyl ether of paraaminophenol and 17.3 parts of the diglycidyl ether of 4,4'-dihydroxydiphenylmethane were admixed at 120° C. with 0.004 part of triphenylphosphine, 16.8 parts of an OH-terminated polysulfone (different molecular weight) and varying amounts of a phenoxy resin of the formula II (degree of polymerization about 100), and the mixture was stirred for 2 hours. 17.3 parts of the polyglycidyl ether of the formula I (average degree of polymerization about 1.4) and 30.1 parts of 4,4'-diaminodiphenyl sulfone were then added, and the mixture was cured at 177° C. for 2 hours and at 200° C. for a further 2 hours.

Results see table.

In a Comparative Test CT, an insufficient amount of emulsifier was added.

TABLE

| Example | $M_n$ of polysulfone | Parts of emulsifier | Morphology | $K_{IC}$ [MPa·m$^{\frac{1}{2}}$] |
|---|---|---|---|---|
| 2 | 11000 | 1.7 | stabilized | 1.45 |
| 3 | 11000 | 1.3 | stabilized | 1.47 |
| 4 | 11000 | 1.3 | stabilized | 1.66 |
| 5 | 14000 | 1.0 | stabilized | 1.68 |
| CT | 14000 | 0.4 | not stabilized | 1.65 |

We claim:

1. A curable impact modified epoxy resin mixture which upon curing exhibits a stabilized multiphase morphology containing
    A. an aromatic, at least bifunctional epoxy compound having an average molecular weight $M_n$ of less than 2000,
    B. an at least bifunctional amine curing agent, and
    C. from 10 to 40 percent by weight of an aromatic thermoplastic polymer which contains reactive groups and has a number average molecular weight of from 4000 to 20,000 and a glass transition temperature of above 120° C.,
with the proviso that epoxy groups and the active hydrogen atoms of components B and C are present in a ratio of from 0.8:1 to 1.6:1, also containing
    D. from 0.1 to 10 percent by weight of a high molecular weight emulsifier which is compatible not only with epoxy compound A but also with polymer C, the amount of emulsifier (D) being effective to result in a cured multiphase system wherein the dispersed phase is of uniform size and shape,
wherein said emulsifier (D) is a phenoxy resin having a molecular weight $M_n$ of more than 4000 to about 42,600.

2. An epoxy resin mixture as claimed in claim 1, wherein component A is selected from the following compounds:

a.

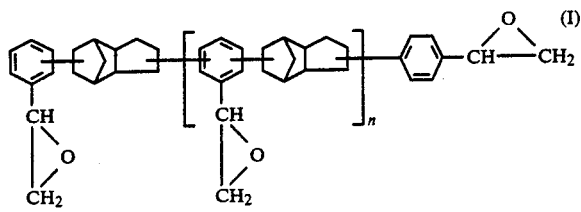

where n is on average from 0 to 3,
b. a diglycidyl ether of a bisphenol,
c. a triglycidyl ether of paraaminophenol.

3. An epoxy resin mixture as claimed in claim 1, wherein component B is, at least in part, 4,4'-diaminodiphenyl sulfone or 3,3'-diaminodiphenyl sulfone.

4. An epoxy resin mixture as claimed in claim 1, wherein component C is an amine- or hydroxyl-terminated polysulfone or polyether sulfone.

5. A high performance composite containing the cured product of an epoxy resin mixture as claimed in claim 1 and from 30 to 70% by volume of a reinforcing fiber.

* * * * *